United States Patent [19]

Kane, deceased et al.

[11] 4,216,093
[45] Aug. 5, 1980

[54] FABRICATED DISC FILTER CORE WITH PIPE HAVING A MAXIMIZED INTERNAL CROSS-SECTIONAL AREA

[76] Inventors: Alfred J. Kane, deceased, late of Munising, Mich.; by Helen Kane, executrix, 1470 Washington St., Munising, Mich. 49862

[21] Appl. No.: 803,204

[22] Filed: Jun. 3, 1977

[51] Int. Cl.² .......................................... B01D 33/26
[52] U.S. Cl. ................................. 210/247; 210/331; 210/345; 210/346
[58] Field of Search ............... 210/331, 247, 346, 232, 210/347, 297, 359

[56] References Cited

U.S. PATENT DOCUMENTS

| | | | |
|---|---|---|---|
| 1,538,980 | 5/1925 | Genter | 210/331 |
| 2,696,916 | 12/1954 | Peterson et al. | 210/331 |
| 2,864,503 | 12/1958 | Hunter | 210/331 |
| 3,471,027 | 10/1969 | Emilsson | 210/331 |
| 3,960,729 | 6/1976 | Peterson et al. | 210/331 |
| 4,075,103 | 2/1978 | Kane | 210/331 |

OTHER PUBLICATIONS

Chemical Engineers Handbook, R. H. Perry et al., McGraw-Hill Book, Co. 1973, 5th Ed., pp. 5-21 to 5-24.

Primary Examiner—Charles N. Hart
Assistant Examiner—David R. Sadowski
Attorney, Agent, or Firm—John E. McGarry

[57] ABSTRACT

A disc filter assembly in which a plurality of filter discs are attached to a central shaft. The central shaft is a fabrication which has a central mandrel. Pipe segments are removably secured around the mandrel with their longitudinal axes parallel to the mandrel's longitudinal axis. The pipe segments have walls which define a trapezoid in cross-section. The walls are positioned such that two side walls define planes which converge relatively close to the longitudinal axis of the mandrel. Each pipe has at least one aperture through which filtrate from the interior of the disc filter segment passes to the interior of the pipe. The pipe is in fluid communication with an end piece having apertures therethrough. The end piece apertures have a trapezoidal cross-section corresponding to the trapezoidal shape of the pipe interior. A wear plate is attached to the outer end of the end piece and has trapezoidal apertures therethrough which are aligned with the apertures of the end piece. A valve head abuts the wear plate and has openings therethrough which have side edges which are aligned with a side edge of an aperture through the wear plate. The filter assembly is used to filter liquids from a taconite slurry.

18 Claims, 15 Drawing Figures

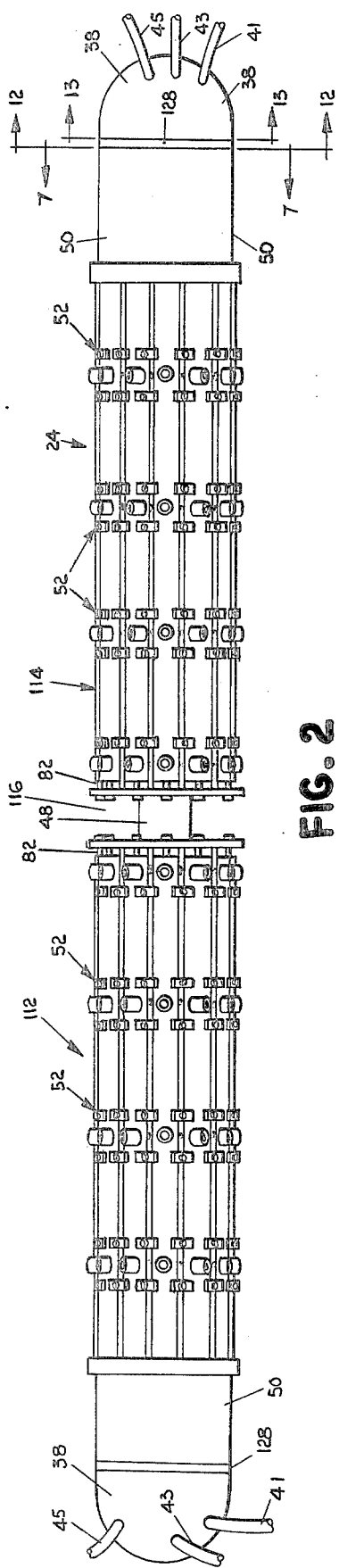
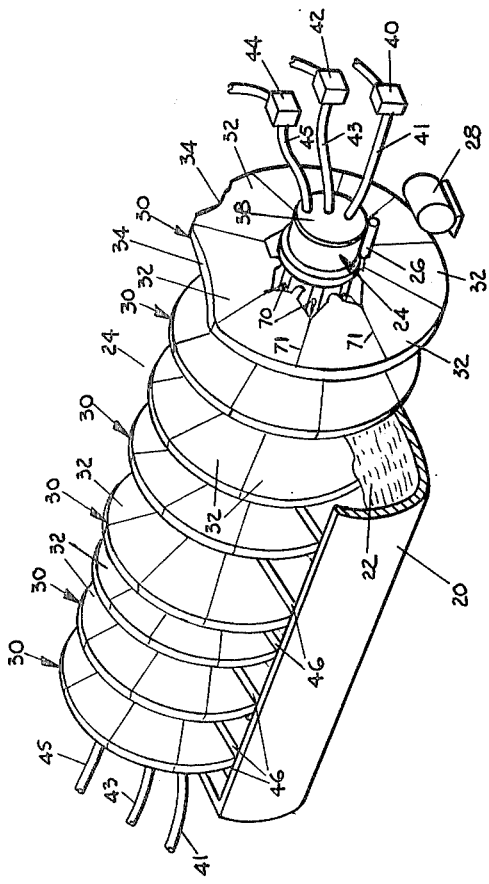
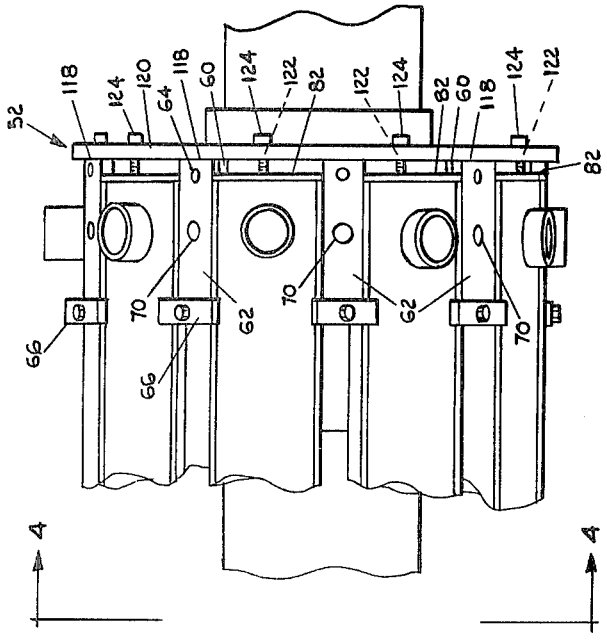

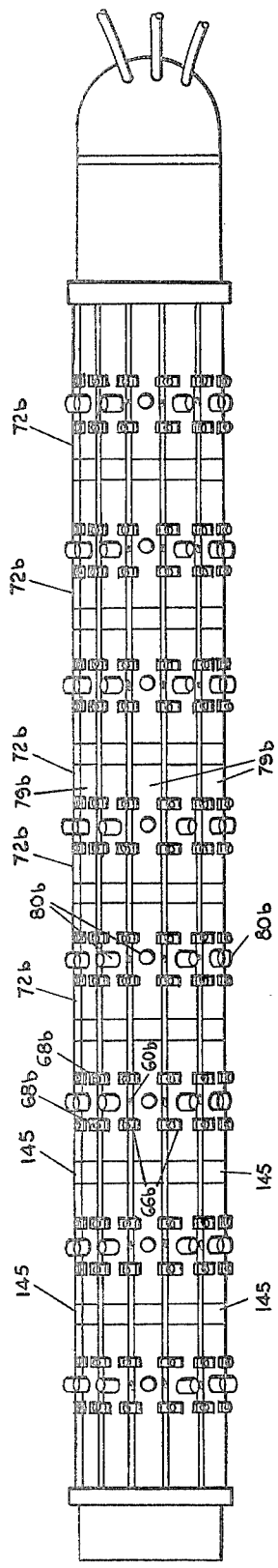
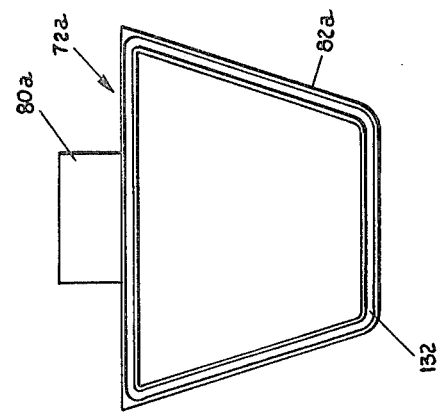
FIG. 11
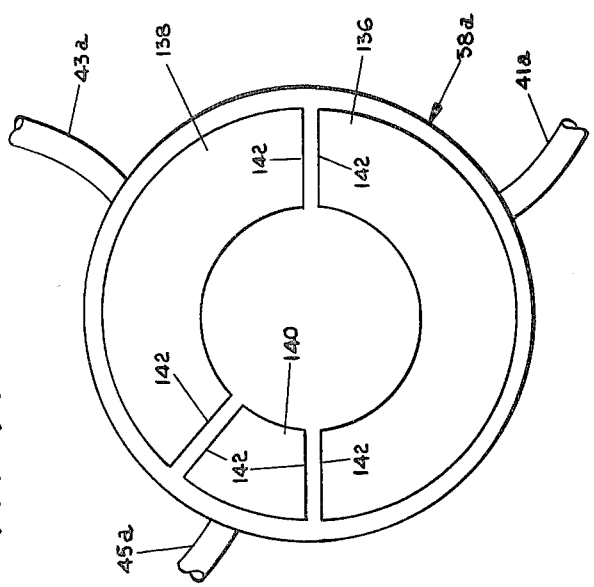
FIG. 13
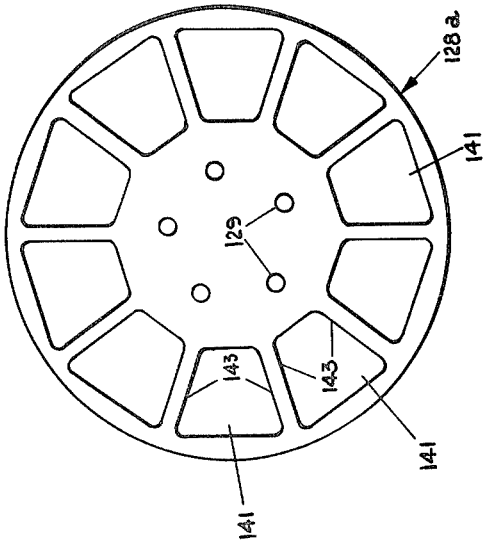
FIG. 12
FIG. 14

FABRICATED DISC FILTER CORE WITH PIPE HAVING A MAXIMIZED INTERNAL CROSS-SECTIONAL AREA

BACKGROUND OF THE INVENTION

1. Field of the Invention

This invention relates to disc filter assemblies and more particularly to a fabricated central shaft supporting the disc filters, wherein the central shaft has mounted thereon pipes which have a trapezoidal cross-sectional shape.

2. Description of the Prior Art

Disc filter segments have long been used in conjunction with a rotatable central core for filtering taconite slurry. Disc filter segments are wedge shaped and have a hollow interior. The disc filter segments are securely mounted about the core. The core rotates to sequentially submerge the successive segments in a slurry. A vacuum draws the slurry filtrate into the filter segments. The filter segments are operably connected to a conduit within the central core. The filtrate enters the conduit and is drawn out through the ends of the central core.

The use of powerful vacuum pumps creates problems when a filter segment tears to allow unfiltered slurry containing iron ore filings, coal particles, or other industrial particulates through the filter. The particulates are drawn into the conduit and cause erosion therein. The erosion is particularly severe on the interior surface of a conduit opposite the aperture leading from the filter segment.

Various modifications and improvements to the disc filter have been sought to improve the reliability of the central core and to lessen the cost of the repair and replacement due to the wear and tear of the central shaft.

In one attempt to solve the problem of erosion, the central core was made from a solid cylindrical piece of cast iron. The conduit passageways are radially placed around an axis of the core with a substantially thick iron wall surrounding each conduit. The passageway through the core is bored and is cylindrical in shape. The central area of the iron core is hollow to provide a lighter weight iron core. When the passageway is eroded, the cylindrical passageway is rebored a little wide. However, erosion eventually eats away to the hollow central area of the core, causing a break in the passageway. The break in the passageway renders the passageway inoperative and causes a general loss of vacuum efficiency.

Replacement of the eroded iron core is costly and time consuming. High cost replacement of the iron core is due to the fine machining that is required to have different sections of the iron core aligned correctly with other sections so that all sections rotate around their axes without wobble. The time required to replace the iron core is significant since the whole filter disc assembly must be disassembled and reassembled onto the new iron core.

Since replacement of the iron core is expensive and time consuming, the repair is often made to the core by merely plugging up the passageway at the point of erosion. The repair by plugging renders at least one filter segment inoperative since the plug blocks any passage from the filter segment to the conduit. The iron core is used until a number of filter disc segments become inoperative due to a plurality of plugs sealing off major portions of the passageways. The economics of replacing an iron core demands that a crippled iron core be used long beyond the point where the iron core is being used efficiently.

Another attempted solution to erosion problem is disclosed in the U.S. Pat. No. 2,894,632 issued to R. B. Myers on July 14, 1959. Myers discloses a modified filter segment integrally connected to a pipe segment which is rotatably mounted onto central shaft. If the filter segment is ripped or the pipe segment is worn, only that section need be replaced. However, the Myers reference is not compatible with the conventional disc filter segments because the pipe segments are integrally formed with the filters.

Another proposed solution to the erosion problem is disclosed in the U.S. Pat. No. 3,659,716 issued to Peterson et al on May 2, 1972. Peterson discloses a filter disc central core assembly having a tubular shell and a plurality of longitudinal pipes welded to the interior surface of the shell. The pipes have a rectangular cross-sectional shape having apertures intervally spaced along the length thereof and have reinforced surfaces at the opposite sides of apertures in the pipes. Removable castings are attached to the pipes and extend outwardly from the pipe apertures. The castings have angled walls which receive the blasting force of the filtrate. The removable castings would have to be replaced at regular intervals of time. The castings are adapted to be attached to conventional disc filter segments. The reinforced surface opposite the aperture and the castings are adapted to be attached to conventional disc filter segments. The reinforced surface opposite the aperture and the castings is designed to receive the force of the flow and increase the time interval for necessary replacement of the central core.

The use of rectangular shaped pipes or circular shaped pipes mounted circumferentially about a tubular shell or mandrel unnecessarily confines the cross-sectional area of the passageways. The confinement of the passageway causes the vacuum to create a greater suction therethrough which increases the wear and decreases the durability of the pipes.

SUMMARY OF THE INVENTION

According to the invention, a filter disc assembly has an elongated central core with disc filter segments mounted thereon. The filter discs have an interior in fluid communication with at least one pipe segment secured to a central mandrel of the central core such that the longitudinal axis of the pipe segment is parallel to the longitudinal axis of the mandrel. The pipe segment is operably connected to a vacuum means. The core is rotatably mounted to sequentially submerge the successive filter segments in a tank containing a slurry.

The pipe segment has two side walls which define plates which converge relatively near the longitudinal axis of the central mandrel. Preferably, the pipe segment has a trapezoidal cross-section wherein a shorter parallel wall of the pipe is nearer a longitudinal axis of the central mandrel and the far parallel wall is farther away from the longitudinal axis of the mandrel.

Securing means secures the pipe to the frame. Preferably, the securing means releasably and replaceably secures the pipe segment to the mandrel so that it may be reusable with a replacement pipe. In one embodiment, the securing means are intervally spaced along the length of the mandrel between two ends thereof. In one embodiment, the securing means are two rings having a collar passing through the central aperture and fixedly secured to the rings. The collar is fixedly secured to the mandrel. A plurality of plates are attached to each ring. The plates preferably radiate outwardly from the mandrel and have planes which preferably intersect along the axis of the common mandrel. Preferably, the plates are spaced apart around the circumference of the rings so that each pipe can be positioned between a pair of plates and spaced from the mandrel surface. Clamping elements are attached to each plate and releasably secure each trapezoidal shaped pipe in a fixed position between two plates. The pipe is positioned between the two plates so that the nonparallel side walls of the pipes are substantially parallel to the adjacent plates.

In one specific embodiment, a portion of the plate at the outer circumference is widened and threaded apertures extend partially therethrough. The wider portion of the plate abuts a nonparallel side of two adjacent pipes. The threaded apertures receive a threaded fastener which secures the disc filter segments to the core. The pipe is operably connected to the disc filter segment so as to form a passage from the filter segment interior to the interior of the pipe.

Preferably, an endpiece is rigidly attached to the mandrel at the ends thereof. The endpiece is cylindrical and is connected to the mandrel so that their respective longitudinal axes are coaligned. The cylindrical surface of the endpiece is rotatably mounted on mounts which rotatably secure the core. In one embodiment, the endpiece has a central aperture through which the mandrel snugly fits. The outer ends of both the endpiece and mandrel have tapped holes. A drive plate having apertures which are aligned with the tapped holes of both the endpiece and mandrel is fitted to abut both the outer end of the endpiece and the outer end of the mandrel. Fasteners extend through the aperture in the drive plate and engage the tapped holes of the mandrel and endpiece to rigidly secure the endpiece to the mandrel.

The endpiece has apertures therethrough which are aligned with the interiors of the pipe segments. In one embodiment, the end of the pipe adjacent the endpiece has a transition portion which has its internal cross-sectional shape gradually change from the trapezoidal to the circular configuration. The circular end of the transition portion is connected to the endpiece so as to form a continuous passage from the apertures of the filter through the pipe and through the endpiece.

In another embodiment, the outer end of the pipe segment is trapezoidal in shape. The endpiece has apertures of trapezoidal cross-section which are aligned with the trapezoidal end of the pipe. The pipe abuts the endpiece and a sealing means seals the seam therebetween to provide a sealed passageway.

A wear plate is fixedly attached to the outer end of the endpiece and also has trapezoidal apertures aligned with the trapezoidal apertures of the endpiece.

Preferably, a valve head which is in fluid communication with a vacuum abuts the wear plate so that the wear plate can rotate with respect to the valve head. The valve head has three arcuate apertures having side edges which define lines intersecting relatively near the axis of the mandrel. One aperture is in fluid communication with a vacuum line. A second aperture is in fluid communication with a second vacuum line. The third aperture is in communication with an air pressure line.

In one embodiment, the pipe extends from the endpiece to the midsection of the mandrel and has its inner end sealed from the ambient atmosphere. Linearly aligned with the pipe segment is another pipe segment which extends from an endpiece at the opposite end of the mandrel to the midsection thereof and has a sealed end. The two sealed ends of the first and second pipe segments have a space therebetween. Within the space is a means to exert pressure on the pipe segments directed toward the respective endpieces so that the open ends of the pipe segments are in sealed fluid communication with the respective aperture through the endpieces. Preferably, the pressure means is a disc coaxially mounted about the mandrel. The disc has fastener elements therethrough which engage the sealed end of the pipe segment which, when fastened, slide the pipe segment to a sealed relationship with the endpiece.

In one embodiment, the trapezoidal pipe is made from two plates of metal welded together. One plate is folded to form the two nonparllel sides and a shorter parallel side. The wider parallel side is a second flat plate welded at its edges to the two side edges of the folded plate. The second plate has apertures intervally spaced therethrough. A connector is press fitted into the aperture in the second plate. The connector is adapted to fit conventional disc filter segment nozzles. The interior side of the folded plate is coated with a wear resistant coating. Preferably, the wear resistant coating is a urethane coating which cushions the sand blast effect of the filtrate rushing through the aperture in the flat wider parallel side of the trapezoidal pipe.

In one embodiment, a plurality of open ended trapezoidal pipe segments are aligned end to end and connected together to form a continuous passageway. Flexible nonporous gaskets connect the adjacent ends of the aligned pipe segments. The pipe segments may have different lengths and a different number of connections for mounting filter disc segments thereon.

Any pipe can be replaced at the time of routine maintenance and repair of the disc filter segments. As the filter segments are checked, erosion of the pipe segments can also be checked. If any pipe segment shows signs of erosion, it can be replaced at the time of discovery of the erosion. The mandrel, securing means fixedly mounted on the mandrel, and the pipe segment secured by the securing means allow any individual pipe segment to be removed without removal of the other pipe segments or disassembly of the filter discs from the central core. Major disassembly of the core is not necessary to remove an individual pipe segment.

The fabricated central core allows increased efficiency of disc filter segments by eliminting the economic necessity of a crippled core which has one or two eroded and inoperative pipe lines. Decrease of efficiency is also eliminated due to the fact that with regular maintenance and replacement of the pipe segments, the vacuum has no percentage loss due to plugged passageways.

The cross-sectional shape of the pipes also increases the durability of the pipes. The cross-sectional shape of the pipes of the present invention is greater than that of cylindrical pipes which would fit circumferentially around the mandrel. The pipe shape, having increased cross-sectional area, allows the filtrate to pass more slowly therethrough, thereby reducing the erosive capabilities of the filtrate. Also an increased volume over the given length of the core provides an accumulator effect which evens out the vacuum effect.

The trapezoidal shape of the endpiece apertures and wear plate apertures in conjunction with the straight side edges of the valve head openings allows for clean and quick valve action and reduces the erosion of the wear plate. The side edges of the apertures in the wear plate are aligned flush with the side edges of the valve head apertures to eliminate excessive wear at one point along the edges of the apertures of the wear plate and valve head.

The pipe segments can be of various lengths and have various numbers of apertures connected to the filter segments. The pipe segment can extend the length of the core and have each end in fluid communication with the vacuum means. Pipe segments can be aligned and connected to each other to form a continuous passageway. The desired length of each pipe segment can be based on the desirability of ease of replacing a pipe segment or the degree of efficiency which is desired in the vacuum. The invention represents a significant improvement in construction of central cores for disc filters. The innovation of the segmented pipes allows easy replacement of eroded pipe segments during the routine check up of the filter segments so that the disc filter vacuum assembly can be run at peak efficiency at nearly all times. No large repair costs or large amounts of time losses would be encountered with routine replacement of the pipe segments as compared to the conventional boring or replacement of the central core. Since the pipe replacement operation is simple and relatively fast, the pipe replacement takes place during normal down time for the filter disc assembly. Another advantage of this invention is that conventional tanks, filter disc segments, and motors which are used with conventional iron core can be used interchangeably with the invention.

BRIEF DESCRIPTION OF THE PREFERRED EMBODIMENT

The invention will now be described with reference to the accompanying drawings, in which:

FIG. 1 is a perspective partically schematic and partially broken view of an embodiment according to the invention;

FIG. 2 is an enlarged side elevational view of the central core shown in FIG. 1;

FIG. 3 is an enlarged fragmentary side elevational view of the midsection of the central core shown in FIG. 2;

FIG. 11 is an end view of a second embodiment of a pipe segment as shown in FIG. 10;

FIG. 12 is an end view of a wear plate as shown in FIG. 2 with trapezoidal apertures;

FIG. 13 is an end view of a valve head as shown along lines 13—13 of FIG. 2;

FIG. 14 is another embodiment of the invention wherein a plurality of trapezoidal segments are aligned to form continuous passageways.

DETAILED DESCRIPTION OF THE PREFERRED EMBODIMENT

Figure 4:
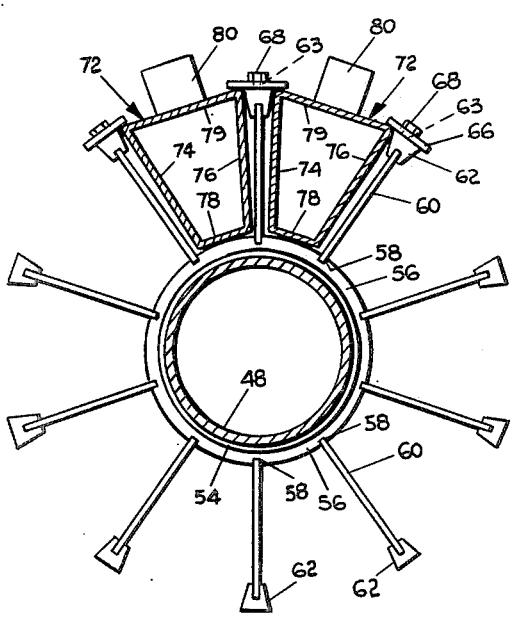
FIG. 4 is a cross-sectional view along line 4—4 of FIG. 3.

As shown in FIG. 1, a tank 20 contains a slurry 22. Rotatably mounted above the tank 20 is a filter core 24. The filter core extends the length of the tank 20. Rotatable mounts 26 rotatably mount the filter core above the tank. A motor 28 drives the mount 26 to rotate the core about its longitudinal axis. Filter discs 30 are integrally spaced along the core. The filter discs are comprised of a plurality of wedge-shaped filter disc segments 32. Each disc segment 32 is connected to the core 24. Each filter disc segment has an interior 34 which is in fluid communiction with a passageway 36 as shown in FIG. 2 running the length of the core 24. At each end of the core, a valve head 38 is mounted adjacent thereto. Three lines 41, 43 and 45 are operably connected to the valve head. A vacuum 40 and a second more forceable vacuum 42 are connected to two of the lines 41 and 43 respectively. The third line 45 is in fluid communication with a pressurizer 44.

Each filter disc has a discharged chute 46 adjacent both sides of the disc 30. The discharged chute catches and collects any particulate matter which is on the surface of the filter disc 30.

Referring to FIG. 2, the filter core 24 has an elongated cylindrical shape and a central mandrel 48. At each end of the mandrel is an end piece 50.

Figure 15:
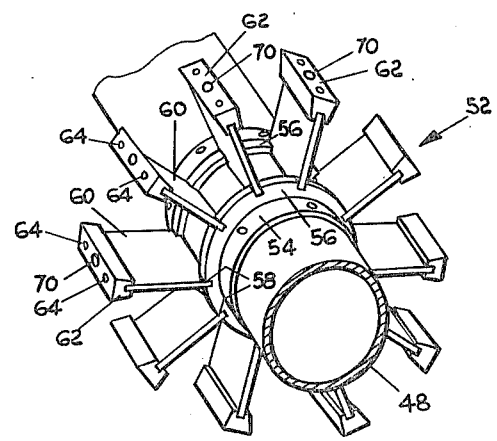
FIG. 15 is a perspective view of a saddle secured to the mandrel.

Intervally spaced along the length of the mandrel are securing means 52 (hereinafter referred to as saddles). As more clearly shown in FIG. 15, saddle 52 comprises a collar 54 which fits around and is rigidly secured to the mandrel. Two rings 56 are rigidly secured to the outer surface of the collar 54. The rings have indentations 58 circumferentially placed around their exterior surfaces. Placed within the indentations 58 and rigidly secured by welding to the rings are plates 60. The plates define planes which converge along the rotatable axis of the center mandrel.

Each radiating plate 60 has a thickened outer portion 62 welded onto the plate. For strong support, the plate 60 fits within a groove of the thicker outer portion 62 and is welded therein. The length of thickened outer portion 62 is coextensive with the outside edge of the radiating plate 60.

Near each end of the thickened outer portion 62 are threaded apertures 64. Rectangular locking clip 66, as clearly shown in FIGS. 3 and 4, having apertures 63 therethrough are placed over the thickened outer portion so that its aperture 63 aligns with the aperture 64 of the thickened outer portion 62. The threaded bolts 68 pass through the apertures of the locking clip 66 and engage apertures 64 for rotatably mounting the locking clip 66 to the outer portion 62.

The locking clip 66 has a rectangular shape wherein its length is greater then the width of the thickened outer portion 62 and its width is not greater than the width of the thickened outer portion 62. The threaded fastener 68 can be tightened to fix the locking clip 66 to the thickened outer portion 62.

In the central portion of the thickened outer portion 62 is a threaded aperture 70. As shown in FIG. 1, an elongated threaded fastener 71 engages the aperture 70 to connect the filter discs 30 to the core 24.

Referring to FIGS. 2 and 4, pipes 72 are secured circumferentially about the central mandrel 48. For simplicity of drawing, only two pipes are shown in FIG. 4. The pipes are secured between adjacent plate 60 and under clips 66. The longitudinal axis of the pipes is parallel to the longitudinal axis of the mandrel 48.

As more clearly shown in FIG. 4, the pipe 72 is trapezoidal in cross section. Pipes consist of two nonparallel side walls 74 and 76, an inner wall 78, and an outer wall 79 parallel to the inner wall 78. Cylindrical connectors 80 are press fitted in apertures intervally spaced through the outer wall 79. The connector 80 is positioned between two adjacent plates 60.

Figure 5:
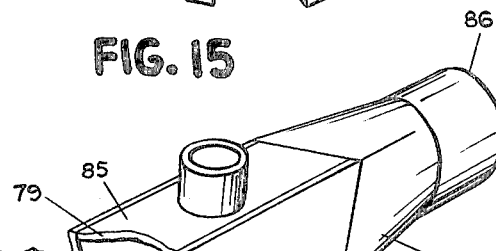
FIG. 5 is an enlarged broken perspective view of a pipe segment shown in FIG. 2.
Figure 6:
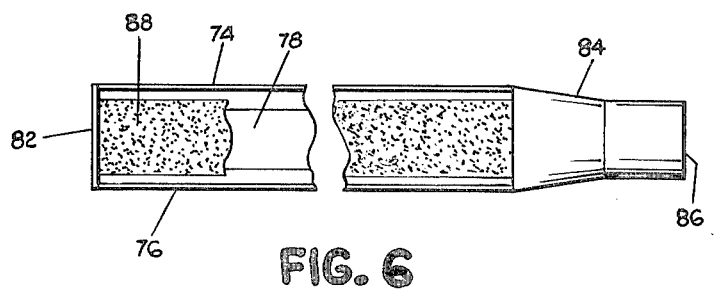
FIG. 6 is a broken and segmented plan view of a pipe segment shown in FIG. 5.

Referring to FIGS. 5 and 6, the pipe 72 has a closed end 82 and a transition portion 84 at its other end. The transition portion has a circular outer end 86. As shown in FIG. 6, the inner wall 78 and two nonparallel side walls 74 and 76 of the trapezoidal pipe 72 are manufactured from a single piece of metal which is folded. As shown in FIG. 5, the outer wall 79 is a separate plate of metal which is welded onto the two outer edges of the side wall. The outer surface 85 of the outer wall 79 is flat.

As shown in FIG. 6, the inner surface of the side walls and bottom wall may be coated with a urethane coating 88. The urethane coating extends partially up the side walls 74 and 76.

Figure 7:
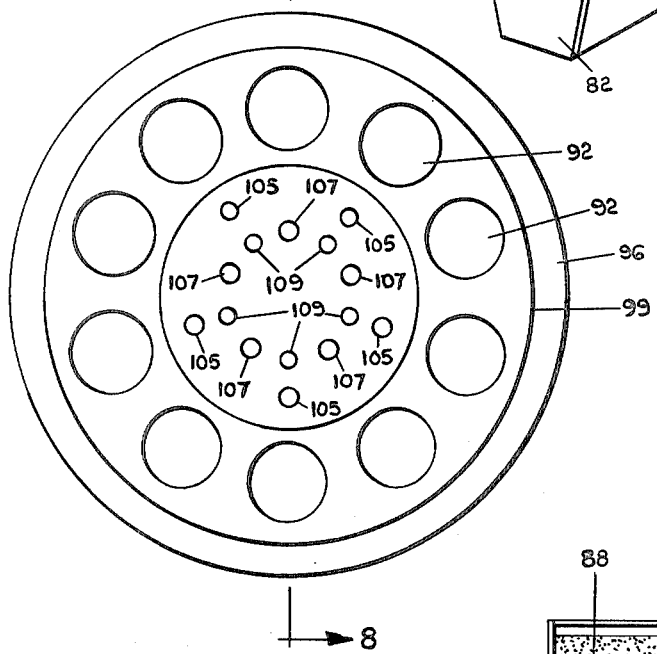
FIG. 7 is an enlarged fragmentary end view of an endpiece taken along the lines 7—7 of FIG. 2.
Figure 8:
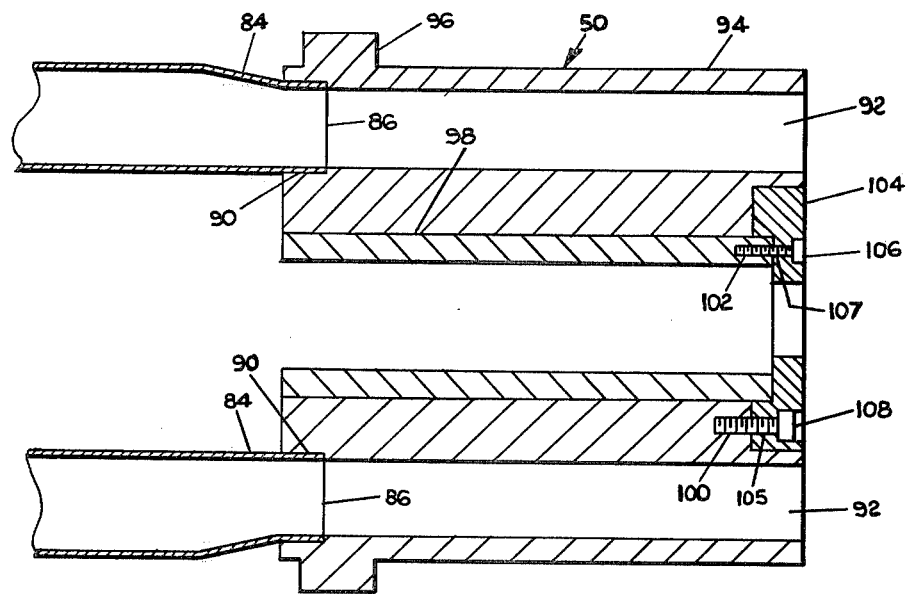
FIG. 8 is a partial cross-sectional view of the filter core taken along the lines 8—8 of FIG. 7.
Figure 9:
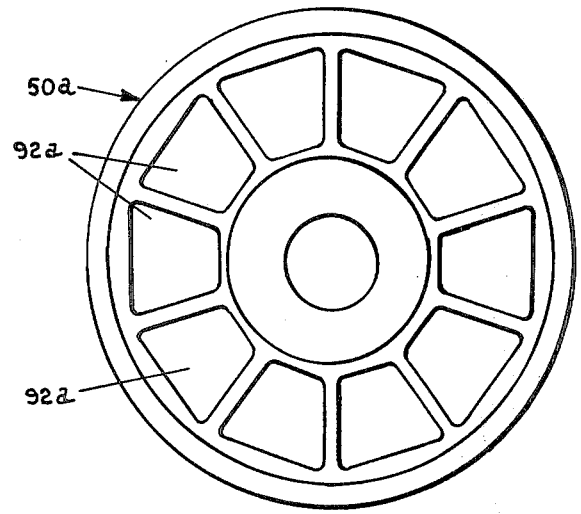
FIG. 9 is an enlarged end view of a second embodiment of an endpiece.

Referring to FIG. 8, the outer portion 86 of the transition portion 84 of the pipe 72 fits within a shoulder section 90 within the end piece 50. Apertures 92 extend through the end piece 50. As shown in FIG. 7, the apertures 92 are cylindrical and are circumferentially placed about the longitudinal axis of the end piece.

The end piece 50 has a cylindrical outer surface 94 and an upwardly extending rim 96 near the inner end of its cylindrical surface 94.

The end piece has a central aperture 98 with the mandrel 48 fitting therein. At the outer end of both the end piece and mandrel are tap holes 100 and 102 respectfully. A drive plate 104, as clearly shown in FIG. 7, having apertures 105, 107 and 109 therethrough is secured to end piece 50 and is placed over the tap holes 100 and 102 so that its apertures 105 and 107 align with tap holes 100 and 102 respectively. Threaded fasteners 106 and 108 engage the drive plate to the mandrel and end piece respectfully. In this fashion, the end piece is rigidly secured to the mandrel.

As shown in FIG. 2, the left-hand set of pipes 12 have their respective longitudinal axes linearly aligned with the longitudinal axes of right-hand set of pipes 114. A space 116 exists between the closed ends 82 of one set of pipes from the closed ends 82 of the other set of pipes.

Referring particularly to FIG. 3, the saddle 52 which is closest to the closed end 82 of each set of pipes has its plates 60 extend beyond the end 82. Attached to the extending side edge 118 of the plate 60 is an annular disc 120. The disc is welded to the extending edges 118 of the plate for rigid attachment thereto. Between each pair of plates 60, the the disc has a threaded aperture 122. A threaded fastener 124 extends through the threaded aperture 122. The threaded end 126 of the threaded fastener 124 abuts the closed end 82 of the pipe 72.

Referring back to FIG. 2, the end piece 50 is attached to a conventional wear plate 128. The wear plate 128 abuts in conventional fashion a valve head 38 which is in fluid communication with, as shown in FIG. 1, two vacuum lines 41 and 43 and a pressure line 45. The core 24 operates in the same way as a conventional iron core. Rotation of the core 24 sequentially dips the filter disc segments 32 of each filter disc 30 in the slurry held in the tank. Liquid is sucked by the first vacuum of the filter assembly from the filter through the pipes and through the end piece. As the core rotates and each filter disc segment withdraws from the slurry, the second vacuum with a higher force draws the remaining liquid from the filter disc segment interiors and pipes. As the core further rotates and the filter disc segments are rotating downwardly toward the slurry, pressurized air from the pressure line 44 flows through the pipe 72 in communication with the particular disc segments which are rotating downwardly. Particulate matter which has coated the exterior of the filter disc segments is then blown off into the discharged chutes 46. The filter disc segment then enters again into the slurry and the process is repeated.

The repair and maintenance of the fabrication can take plce simultaneously with the routine check and maintenance of the disc filter segments. As an operator routinely checks for tears and other malfunctioning of the filter disc, he can also visually inspect the pipes and connectors. If a pipe 72 is eroded, the pipe 72 can be replaced at the time the erosion is discovered.

The removal and replacement of a pipe can be accomplished with a minimum amount of labor. The operator detaches the filter disc segments from the eroded pipe connectors 80. He then loosens the bolt 68 which secures clip 66 which secures the pipe to the saddle. Once the bolt 68 is loosened, clips 66 can be turned to disengage from the pipe 72. Threaded fastener 124 is then turned so that a space exists between the seal end 82 of the pipe 72 and the threaded end 126 of the fastener 124. The eroded pipe 72 is then slid out of the shoulder 90 of the end piece and removed from the saddle and is replaced by a new pipe. The clips 66, threaded fastener 124, and bolt 68 are then retightened to secure the new pipe in its place. The disc filter segments are reconnected to connectors 80.

None of the other pipes 72 have to be removed when replacing the eroded pipe. Only the filter disc segments connected to the eroded pipe have to be disconnected from the respective connectors 80. Only the one particularly eroded pipe needs to be replaced. A minimum amount of parts need to be touched or replaced in order to repair a broken conduit passageway.

Another advantage is that the pipe can be secured to the core independently from securement of the filter disc segments. In this fashion, the filter discs segment can be replaced without loosening any of the pipe segments from the core.

In this manner, the disc filter segments and core assembly can be easily maintained in a completely repaired state and can be operated at maximum efficiency.

Figure 10:
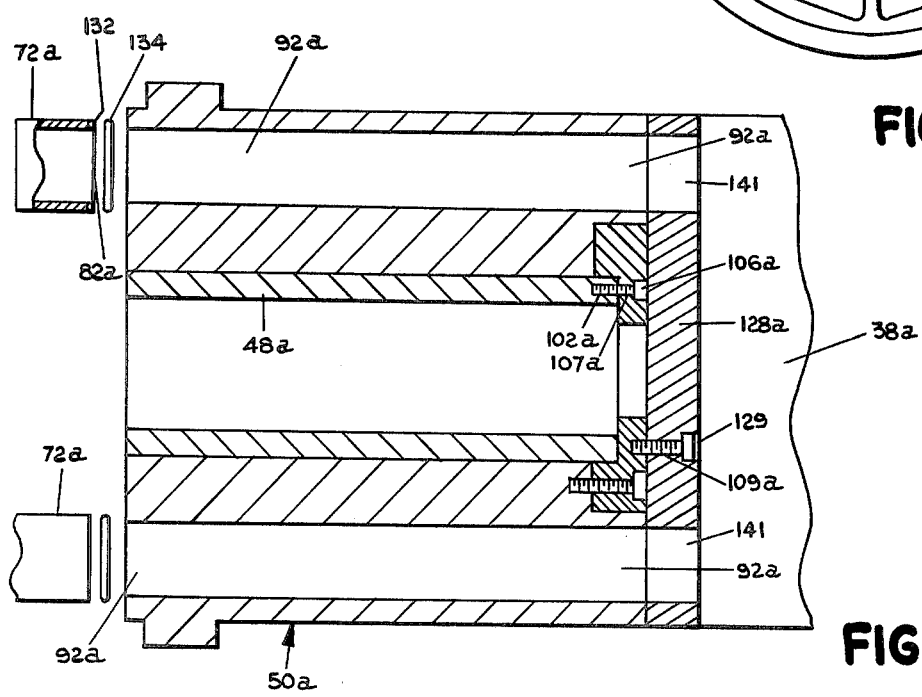
FIG. 10 is a cross-sectional view of a second embodiment of the filter core using the endpiece shown in FIG. 9.

A second embodiment, according to the invention, is referred to in FIGS. 9 through 13. The second embodiment has the same external appearance as the first embodiment as shown in FIG. 2. Referring particularly to FIGS. 10 and 11, the pipe segment 72a has an outer end 82a which is trapezoidal in cross section. The end edges of the pipe have a groove 132 adapted to fit a seal 134. As shown in FIG. 10, the outer end of the pipe abuts the inner end of the end piece 50a. The apertures 92a through the end piece are trapezoidal in cross section and correspond to the cross-sectional interior area of the trapezoidal shape pipe 72a.

As shown in FIG. 10, a wear plate 128a is secured to the end piece outer end. The wear plate 128a has apertures 129 therethrough aligned with threaded apertures 109a in the drive plate. Threaded fasteners 131 extend through aperture 129 and engage threaded aperture 109a.

Referring to FIG. 12, the wear plate has trapezoidal apertures 141 therethrough which align with outer ends of the trapezoidal apertures 92a of the end piece. Each trapezoidal aperture 141 has nonparallel outer side edges 143 which define lines which converge near the axis of mandrel 48a.

Referring to FIGS. 10 and 13, the wear plate 128a abuts a valve head 38a. The valve head has three valve openings 136, 138 and 140. The valve openings are arcuate and have flat side edges 142 which define lines which converge near the axis of the central mandrel 48a. As the wear plate rotates about its central axis, the trapezoidal apertures 141 are in fluid communication with one of the valve openings 136, 138 and 140. Valve opening 136 is connected to a first vacuum line 41a. Valve opening 138 is connected to a second vacuum line 43a and the third valve opening 140 is connected to the pressure line 45a in the same manner as the first embodiment.

In operation and maintenance, the second embodiment works in the same fashion as the first embodiment with the filtrate flowing through the interior of the filter disc through the connector and through the passageways defined by the pipes, end piece, wear plate and valve head. As the core rotates, the outer end of the wear plate aperture passes by the side edges 142 of the valve head openings in the aligned fashion. By having the edges 142 and 143 align as the side edge 143 rotates by the side edge 142, eddies and undesirable currents which can cause excessive erosion along the edges of the apertures 141 of the wear plate and the edges of the valve head openings are minimized.

Referring to FIG. 14, another embodiment is shown. Trapezoidal pipe segments 72b are aligned adjacent to other pipe segments 72b to form a continuous passageway between two end pieces 50b. Each pipe segment 72b has two open ends. The open ends of each adjacent pipe segment have a seal 145 wrapped therearound to form a leakproof passageway. Each pipe segment 72b is fitted between a pair of plates 60b of saddles 52b. A trapezoidal pipe segment 72b has a connector 80b extending from an outer flat wall 79b. Locking clips 66b secured to the plates 60b by bolts 68b releasably secure the pipe segments 72b.

In operation, the clips 66b just need to be disengaged from the eroded pipe segment 72b. The eroded pipe segment 72b is then removed from the seals 145 and is replaced by a fresh pipe segment 72b. The clip and bolts are then retightened to secure the pipe segment to the saddle 52b.

It should be understood that the foregoing embodiments of the present invention are merely illustrative of the preferred practice of the invention and various changes and modifications may be made in the arrangements and details of construction of the embodiments described herein without departing from the spirit and scope of the invention.

The embodiment of the invention in which an exclusive property or privilege is claimed are defined as follows:

1. In a filter disc assembly for use in conjunction with a tank containing a slurry, radiating segmented filter discs supported by a central elongated core, means for rotatably mounting the core along its longitudinal axis above the tank such that when the core rotates, each segment of the filter disc alternately enters and withdraws from the tank, passages along the longitudinal length of the core, each filter disc segment having a hollow interior in fluid communication with one of the passages of the core, a vacuum means operably connected to the passages at selected rotational positions of the core to draw slurry filtrate through the filter disc segments and through the passages, the improvement in the rotatable central core comprising:
   an elongated frame;
   each of the passages being formed by at least one removable pipe section having a trapezoidal cross-section with radially disposed side walls for maximizing the flow of liquid through the passages;
   a plurality of radially extending plates which have a plane in common with the central axis of the central core, the plates being substantially radially coextensive with the pipe segments and the pipe segments substantially filling the space between the radially extending plates; and
   clips rotatably mounted on top of the plates, wherein said clips include a flange portion which seats against the pipe segments to secure said pipe segments in one rotational position, and which releases the pipe segments in a second rotational position, the clips thereby releasably and replaceably secured each pipe segment circumferentially about the elongated frame such that the pipe segments are replaceable and new pipe segments are secured by the rotatable clips.

2. A filter core as defined in claim 1 wherein the radially extending plates are intervally spaced along the length of the elongated frame between two ends of the frame.

3. A filter core as defined in claim 2 wherein at least two pipe segments are linearly aligned when secured to the elongated frame; and
   each pipe segment has its outlet in fluid communication with the vacuum means and its inlet in fluid communication with the interior of one segment of one filter disc.

4. An apparatus as defined in claim 1 wherein the frame includes:
   a mandrel;
   an end piece;
   means for rigidly attaching the end piece to the mandrel;
   the end piece having at least one aperture therethrough which has an inner end in fluid communication with the outlet of the pipe segment;
   the vacuum means operably connect with an outer end of the aperture through the end piece; and
   the mounting means engages the end piece.

5. A filter core as defined in claim 4 wherein the aperture through the end piece has a cylindrical shape, the pipe segment has a transition portion wherein its outer open end has a circular shape defined by top, bottom, and two side walls of the pipe segment.

6. A filter core as defined in claim 5 wherein the inner end of the aperture through the end piece has a shoulder portion which receives outer end of the transition portion of the pipe section;

the pipe extends to a midsection of the mandrel and has a sealed inner end; and further comprising;

reusable abutting means for releasably forcing the outer end of the transition portion to the shoulder portion of the end piece.

7. A filter core as defined in claim 6 wherein the reusable abutting means engages the sealed end of the pipe section such that the means are disengaged from the sealed end to allow the transition portion to be removed from the shoulder portion of the end piece.

8. A filter core as defined in claim 7 wherein the reusable abutting means comprises;

a plate rigidly secured to the midsection of the mandrel; and fasteners attached to the plate and movable between two positions, a first position which secures the pipe section within the shoulder portion and a second position which allows the pipe section to be removed from the shoulder portion.

9. A filter core as defined by claim 4 wherein the aperture through the end piece has walls aligned congruent with the interior surfaces of the pipe segment whereby the side walls of the aperture define planes converging near the axis of rotation of the frame.

10. A filter core as defined by claim 9 wherein the end piece has an outer end, the aperture through the end piece has its longitudinal axis substantially aligned with the longitudinal axis of the pipe segment, the aperture extends through the outer end of the end piece, and further comprising:

a wear plate;

means for fixedly attaching the wear plate to the outer end of the end piece; and the wear plate having at least one aperture therethrough in fluid communication with the aperture through the end piece, the walls of the aperture aligning with the walls of the aperture through the end piece.

11. A filter core as defined by claim 10 further comprising a vacuum valve coupling operably connected to the wear plate; the coupling having at least one valve opening having an outer end, each outer end having side edges defining lines intersecting near the axis of rotation of the frame and substantially transverse to the same axis.

12. A filter core as defined in claim 4 wherein the attaching means includes:

at least one tapped hole in the end of the mandrel;

a central aperture in the end piece through which the end of the mandrel is positioned;

at least one tapped hole in the outer end of the end piece;

a plate having apertures therethrough and placed adjacent the outer end of the end piece and the end of the mandrel such that the apertures of the plate align with the tapped holes of both the end piece and mandrel; and fastening means extending through the plate apertures and into the tapped holes for rigidly securing the plate to the end piece and mandrel.

13. A filter core as defined in claim 1 wherein the pipe section has two side walls and a bottom wall integrally formed from a folded piece of nonporous material, a top wall is attached to the folded piece such that the seam between the two pieces is sealed, and the inlet of the pipe segment extends through the far wall.

14. A filter core as defined in claim 13 further comprising:

a wear resistant coating on the interior surface of the folded piece of non-porous material opposite the inlet.

15. A filter core as defined in claim 1 wherein the frame includes:

a mandrel;

two end pieces; and means for rigidly attaching each end piece to the mandrel, each end piece having at least one aperture therethrough which has one end in fluid communication with one of the outlets of the pipe segments, the vacuum means operably connected to the other end of the aperture through each end piece, space lies between two of the linearly aligned pipe segments at a midsection of the elongated frame, each pipe segment having a sealed end adjacent the space.

16. A filter core as defined in claim 15 further comprising:

a reusable abutting means for releasably forcing the outer ends of the pipes to abut one of the end pieces to provide for a sealed passage from the interior of the pipe section and through the aperture in the end piece.

17. A filter core as defined in claim 16 wherein the reusable abutting means comprises:

a plate rigidly secured to the midsection of the mandrel; and fasteners attached to the plate and movable between two positions, a first position which forces the pipe against the end piece and a second position disengaged from the pipe section.

18. A filter disc assembly according to claim 1 wherein the wall of the pipe section nearest the central axis has a wear-resistant coating thereon.

* * * * *